United States Patent [19]
Matsumoto et al.

[11] Patent Number: 5,189,805
[45] Date of Patent: Mar. 2, 1993

[54] COORDINATE MEASURING MACHINE

[75] Inventors: Masakazu Matsumoto; Keizo Takahashi, both of Utsunomiya, Japan

[73] Assignee: Mitutoyo Corporation, Tokyo, Japan

[21] Appl. No.: 764,710

[22] Filed: Sep. 24, 1991

[30] Foreign Application Priority Data

Sep. 28, 1990 [JP] Japan ............................ 2-102138[U]

[51] Int. Cl.⁵ ................................................ G01B 5/03
[52] U.S. Cl. ...................................... 33/503; 33/1 M
[58] Field of Search ............... 33/503, 1 M, 504, 549, 33/551, 553, 554, 556

[56] References Cited

U.S. PATENT DOCUMENTS

| | | | |
|---|---|---|---|
| 3,241,243 | 3/1966 | Speer | 33/503 |
| 4,305,207 | 12/1981 | Lantz | 33/503 |
| 4,551,919 | 11/1985 | Sakata et al. | 33/503 |
| 4,630,381 | 12/1986 | Sakata et al. | 33/503 |
| 4,651,426 | 3/1987 | Band et al. | 33/503 |
| 4,805,314 | 2/1989 | Hayashi et al. | 33/503 |
| 4,947,557 | 8/1990 | Gapshis et al. | 33/503 |
| 4,964,221 | 10/1990 | Breyer et al. | 33/503 |

FOREIGN PATENT DOCUMENTS

| | | | |
|---|---|---|---|
| 0393795 | 10/1990 | European Pat. Off. | 33/503 |
| 2248194 | 4/1973 | Fed. Rep. of Germany | 33/503 |
| 1389527 | 1/1965 | France | 33/556 |
| 0200420 | 9/1986 | Japan | 33/503 |

Primary Examiner—Thomas B. Will
Attorney, Agent, or Firm—Flynn, Thiel, Boutell & Tanis

[57] ABSTRACT

A coordinate measuring machine having a gate-type slider device, which includes a pair of columns in a parallel state to each other and a beam crossing from one column to another one, the gate-type slider being movable with reference to a table, so that the coordinate measuring machine is capable of the measurement of dimensions and configuration of an object to be measured by using a measuring element which is attached to the slider device; the coordinate measuring machine having at least one driving device for moving the slider device by relating to the column, the driving device being above the table and below the center of gravity of the slider device, so that the inertia of the slider is minimized and the fine measurement is performed.

6 Claims, 6 Drawing Sheets

COORDINATE MEASURING MACHINE

BACKGROUND OF THE INVENTION

1. Field of the Invention

This invention relates to a coordinate measuring machine, especially to an improvement of a drive mechanism for a gate-type slider of the coordinate measuring machine.

2. Description of the Related Art

It is known that various kinds of coordinate measuring machines are used for accurate measurements of the dimensions and configuration of an object to be measured.

One of the typical machines has a gate-type slider which moves on a table thereof. Since the slider can go aside on the table, the object is easily placed onto and taken off from the table and the capacity of measurement is high, so that this type of machine is commonly used.

One example of this machine is illustrated in FIGS. 4 and 5.

The typical coordinate measuring machine 60 has a table 61 supported on the floor or ground. A slider device 70 is supported on the table 61 and on which an object W to be measured is to be placed.

The slider device 70 is fit together with a Y-slider 71 shaped like a gate and moving in a Y-direction, a X-slider 72 moving in a X-direction along the Y-slider, and a Z-slider 74 having a measuring element 73 and moving in a Z-direction through the X-slider 72.

The Y-slider 71 is constructed with two columns 71A, 71B and a beam 71C which crosses from one to another of the columns 71A, 71B so as to have a shape of the gate. At a side 61A of the table 61, a driving device 80 for moving the Y-slider 71 in the Y-direction and a guide member 85 are provided for the column 71B. The driving device 80 consists of a motor 81 and a ball screw 82 connected with a shaft of the motor 81 and being rotated in direction of the arrow R.

The X-slider 72 and Z-slider 74 are also provided with respective driving devices not shown so as to move in individual directions X, Z.

The measurement of the object W by the coordinate measuring machine 60 is done as follows. First of all, the motor 81 is operated to make the ball screw 82 turn along the R-direction, which causes the Y-slider 71 to move in the Y-direction. Subsequently, the driving devices of the X-slider 72 and Z-slider 74 are so operated that the measuring element 73 comes into contact with the object W to obtain the dimensions or traces the outer surface of the object W to obtain the shape.

It is known well that a center of gravity for the slider 70 in the coordinate measuring machine 60 is around a point denoted by "G" in FIGS. 4, 5.

A moment of inertia I of the center of gravity G can be defined by a formula $I = \alpha M L$; wherein M is a weight of the slider 70, $\alpha$ is an acceleration of the slider 70 moving toward Y-direction and L is a distance from the center of gravity G to the driving device 80. Incidentally, the distance L is rather long, so that the moment of inertia I becomes big in proportion thereto.

Hence, such big inertia I causes the Y-slider 71 to tilt, swing and vibrate, whenever the Y-slider is moving, so that the accuracy of measurement for the configuration of the object is lost.

It is natural to decrease the acceleration $\alpha$ of the Y-slider 71 in order to minimize the inertia I, but this is not preferable for a fast measurement. Otherwise, the inertia I may be minimized by decreasing the weight of the slider 70, but this is not preferable to keep enough contractual strength.

It is then considered to make the distance L short by placing the driving device 80 near the center of gravity. But, it is necessary for the driving device 80, having the motor 81, bearing and the like, to be provided at a special support throughout the Y-direction of the table 61. The special support for the driving device 80 is an obstacle for the free placement of the object W onto and off from the table 61, which is a demerit of the conventional gate-type coordinate measuring machine in view of price and space.

One of the objects in the present invention is to provide a coordinate measuring machine which is not affected by an inertia and performs fine measurement, while keeping some merits of the conventional coordinate measuring machine.

SUMMARY OF THE INVENTION

The mentioned object can be attained by providing a driving device adjacent the center of gravity of the slider to some extent.

The inventive coordinate measuring machine has a gate-type slider device, which includes a pair of columns in a parallel state to each other and a beam crossing from one column to another one, the gate-type slider being movable with reference to a table, so that the coordinate measuring machine is capable of the measurement of dimensions and configuration of an object to be measured by using a measuring element which is attached to the slider device; the coordinate measuring machine comprising at least one driving means for moving the slider device by connecting it to the column, the driving means being above the table and below the center of gravity of the slider device.

The driving means may include a ball screw and a nut member provided on the column. The ball screw is in a state or position defined by the formula of $1/6H \leq h \leq 5/6H$; wherein "H" is a distance from the surface of the table to the top of the Y-slider, and "h" is a distance from the surface of the table to the center axis of the ball screw. But, the position is preferably defined as $\frac{1}{4}H \leq h \leq \frac{3}{4}H$.

The moving means may be connected to the column through an eccentric motion distransmitting device. The eccentric motion distransmitting device consists of a pair of balls and length control members, so that the nut member and the Y-slider horizontally keep the positional relationship with the ball screw but can change it in a direction perpendicular to the axis of the ball screw.

The driving means may be provided on both columns and synchronized with each other. The two columns are of the same size. The slider may consist of an integral construction of a pair of columns and a beam crossing between them.

Measuring the object to be measured occurs by displacing the slider device by operating the driving means, contacting the measuring element, which is attached to the slider device, to several points on the object, and then the measured data is sent to a processing device such as a computer to obtain the result of measurement.

The drive of slider device is done above the table and below the center of gravity of the slider device, so that the slider device does not tilt and vibrate as in the past, but moves straight to thereby perform fine measurement of the dimensions and configuration of the object W.

DETAILED DESCRIPTION OF THE PREFERRED EMBODIMENT(S)

The following is a description of the most preferable embodiment of the present invention with reference to the attached drawings.

Figure 1A:
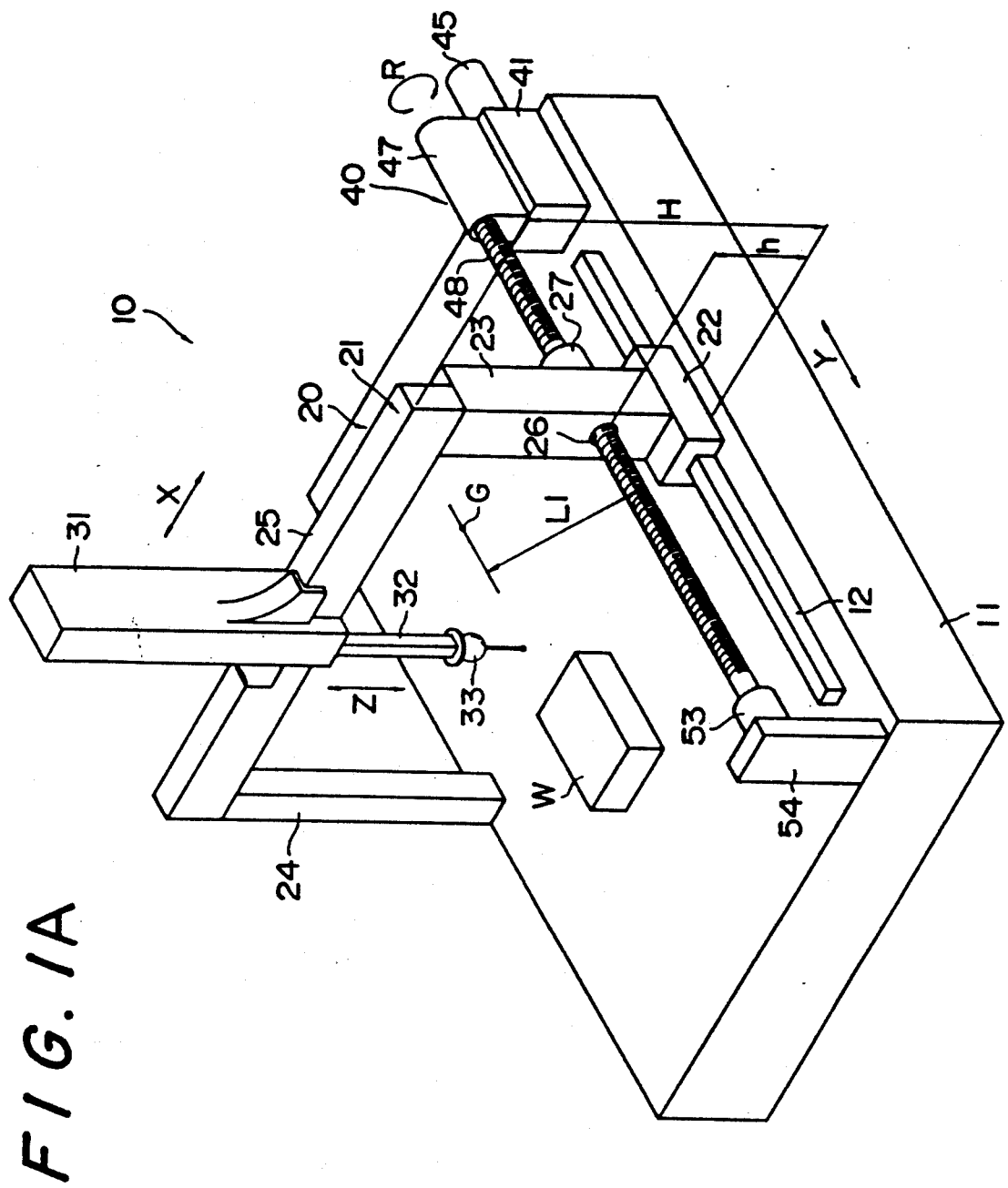
FIG. 1A is a perspective view showing one embodiment of the coordinate measuring machine of the present invention.
Figure 1B:
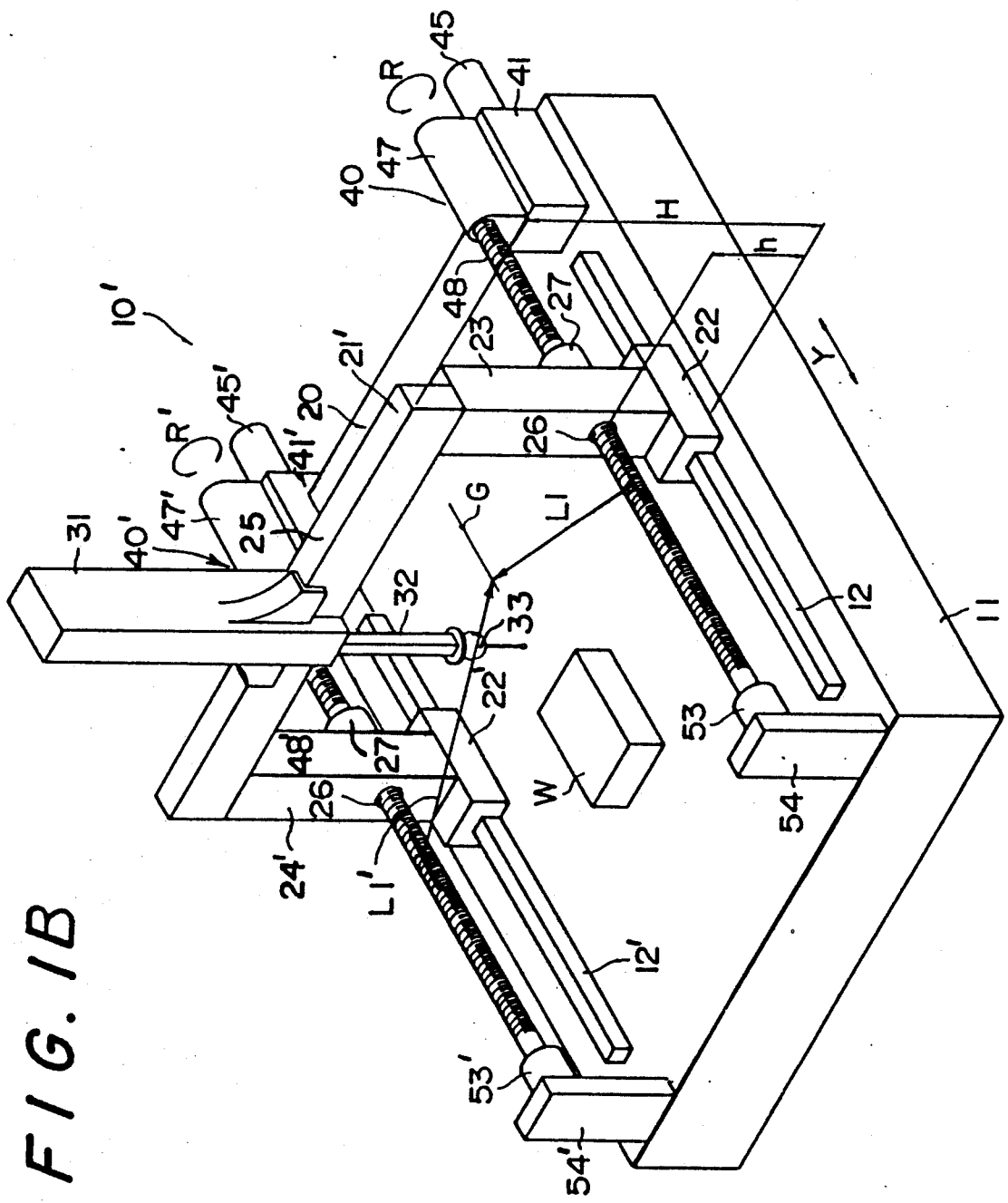
FIG. 1B is a perspective view showing another embodiment of the coordinate measuring machine.

In FIG. 1, denoted by 10 is a coordinate measuring machine. The machine 10 has a table 11 supported on the ground which can receive an object W to be measured thereon; generally on the center portion. Along one longitudinal side on the table 11, a guide rail 12 is provided. The guide rail 12 is employed to guide a slider device 20 explained in detail below.

The slider device 20 has a Y-slider 21 movable in the "Y" direction in this machine 10. The Y-slider 21 can move along the guide rail 12 via an air-bearing and is constructed with a supporting member 22 sliding on the guide rail 12 along the Y-direction, one prismatic column 23 standing on the supporting member 22, another prismatic column 24 being on the table 11 and in a parallel state to the column 23, and a beam 25 crossing from an upper portion of the column 23 to that of the column 24.

On the beam 25 of the Y-slider 21, a X-slider 31, which is equipped with a driving device for the displacement along the "X" direction in the drawing, is provided. This X-slider 31 contains therein a Z-slider 32 having the driving device not shown capable of moving toward the "Z" direction in the drawing. The Z-slider 32 detachably holds a measuring element 33 at its lower end portion.

The X-slider 31 and the Z-slider 32 are also provided with respective air-bearings not shown.

In the one column 23 of the slider device 20, a hole 26 is provided. The hole 26 has a nut member 27 aligned with the center line thereof and partially projects from the column 23 after being mounted in the hole 26.

Nearby the guide rail 12 on the table 11, a driving device 40 to move the slider device 20 in the Y-direction is provided. The driving device 40 is provided with a box 41, shown in FIG. 2, on the table 11. The box 41 contains therein a rotating element 42 having a timing pulley. A rotating shaft 43 of the rotating element 42 is connected with a drive shaft 46 of a motor 45 through a coupling 44.

On the box 41, a bearing member 47 is provided. The bearing member 47 is provided for supporting one side of a ball screw 48 rotating in the "R" direction. At one end portion of the shaft 49 of the ball screw 48, a rotating element 51 with a timing pulley is provided. The rotating element 51 and the already explained rotating element 42 are connected to each other by a timing belt 52. Thus, if the motor 45 is operated, the ball screw 48 would be turned in the R-direction via the coupling 44, the rotating element 42, the timing belt 52 and the rotating element 51 in this order.

The ball screw 48 relates to the nut member 27 provided in the column 23 on its way and is supported by a mounting plate 54 on the table 11 via a bearing 53 at its another end portion. Accordingly, if the ball screw 48 is rotated, the column 23 or the slider device 20 would be reciprocally moved in the Y-direction via the nut member 27.

Incidentally, the driving device 40 connected with the slider device 20 via the ball screw 48 and the nut member 27 is disposed at an upper side of the table 11 and at a lower position than the center of gravity G of the slider device 20. The center of gravity G of the coordinate measuring machine 10 in this embodiment is rather nearer to the driving device 40.

Actually, if the distance from the surface of the table 11 to the top of the Y-slider 21 is referenced by the letter "H", the distance or dimensional range "h" from surface of the table 11 to the center axis of the ball screw 48 in the driving device 40 can be defined by the formula of $1/6H \leq h \leq 5/6H$, preferably $\frac{1}{4}H \leq h \leq \frac{3}{4}H$ or $h = 3/10H$. This is because if the distance h is smaller than 1/6H, the inertia would not being small due to the short distance from the table 11. While, if the distance h is bigger than 5/6H, the Y-slider would not slide smoothly since the distance, from the sliding surface between the Y-slider 21 and the guide rail 12 to the center axis of the ball screw 48, becomes too long.

If the weight of slider device 20 is referenced by the letter "M", the acceleration of the slider device referenced by the letter "α", and the distance from the center of gravity G to the center axis of the ball screw 48 in the driving device 40 by the letter L1, the inertia I of the slider device 20 when being moved can be defined by the formula; $I = \alpha ML1$.

Figure 2:
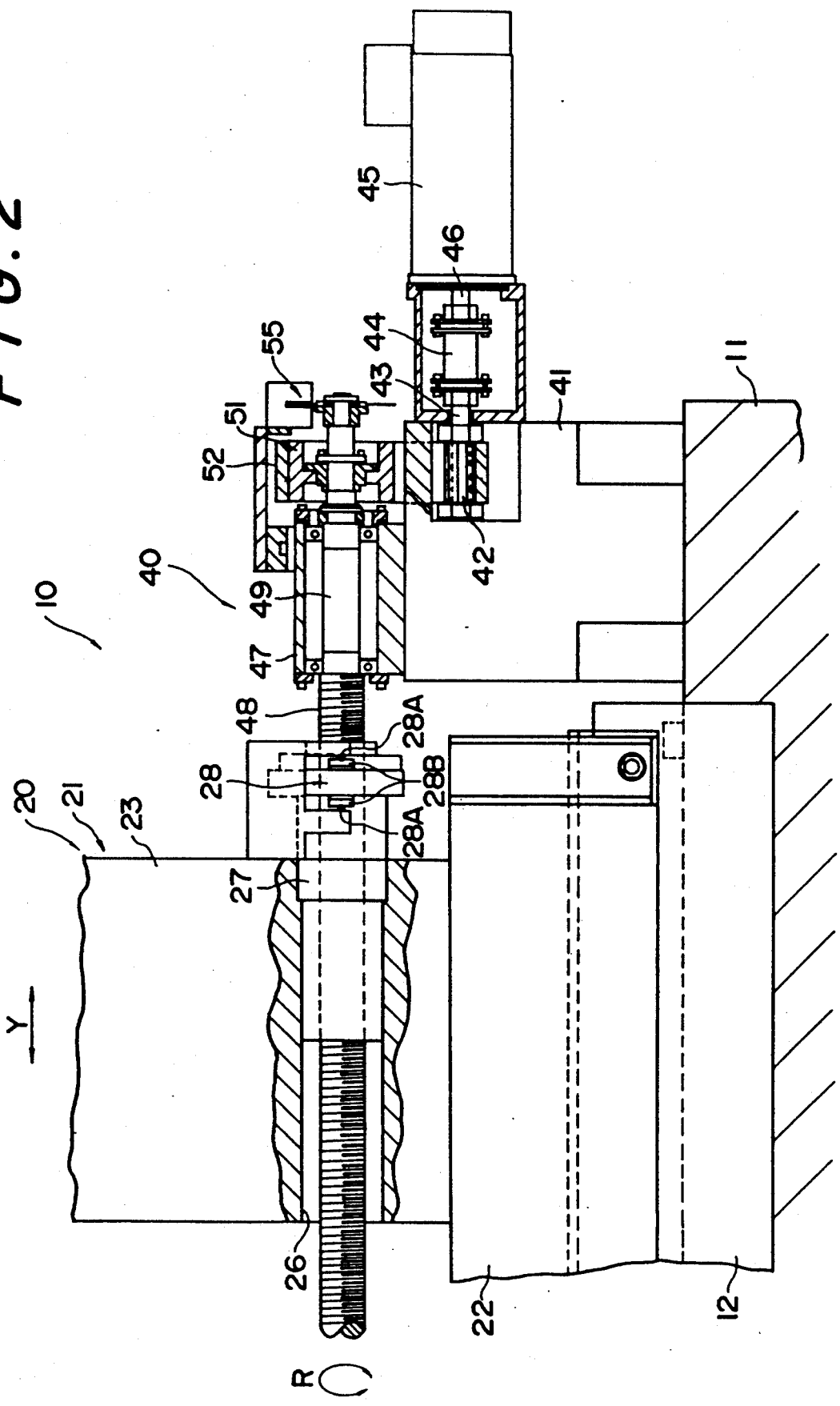
FIG. 2 is an enlarged sectional view showing an essential portion of a driving device of the embodiment.
Figure 3:
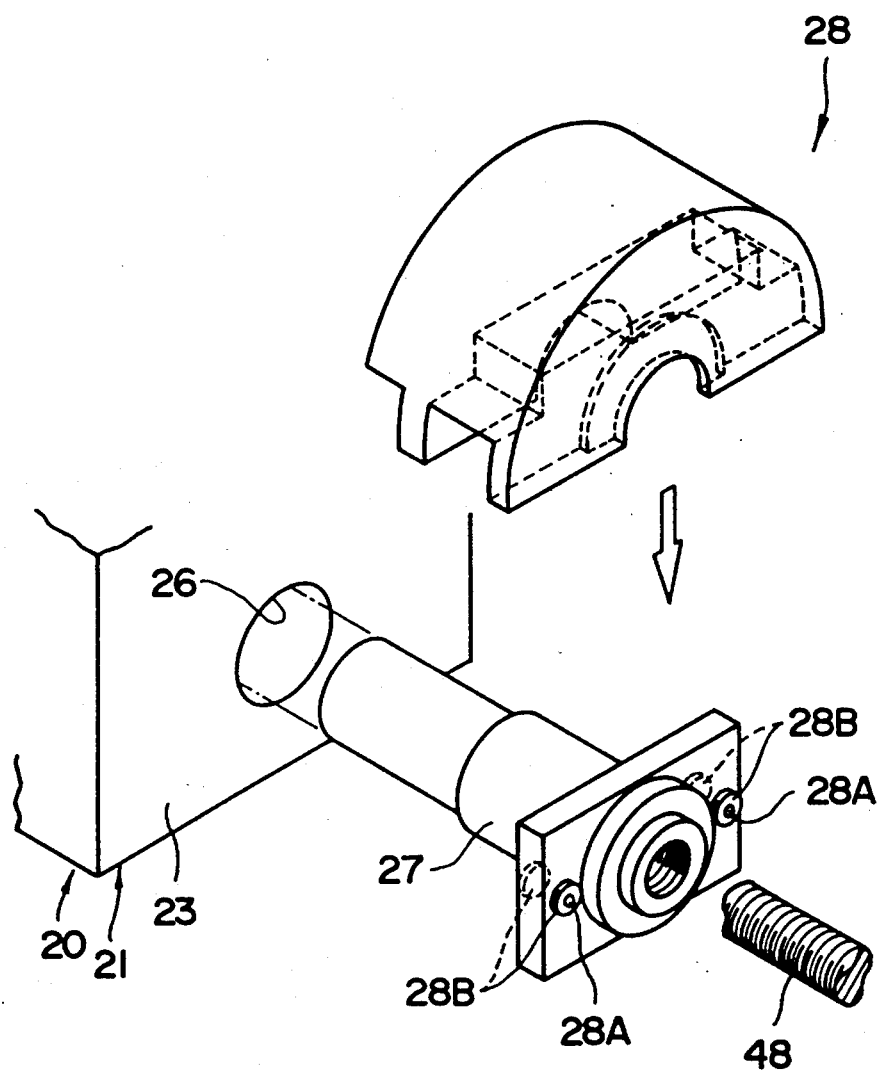
FIG. 3 is a disassembled perspective view showing an essential portion of an eccentric motion distransmitting device.
Figure 4:
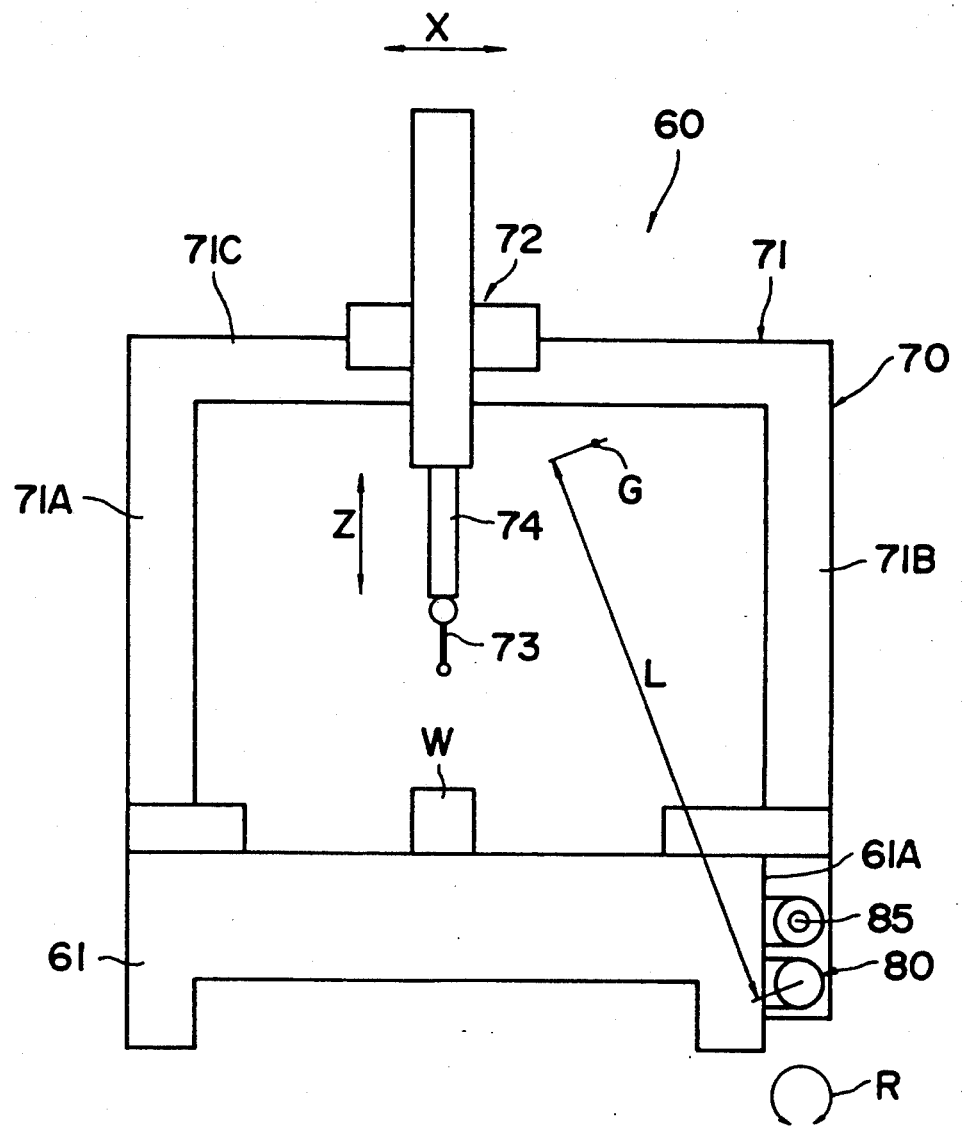
FIG. 4 is a front view showing a conventional example.
Figure 5:
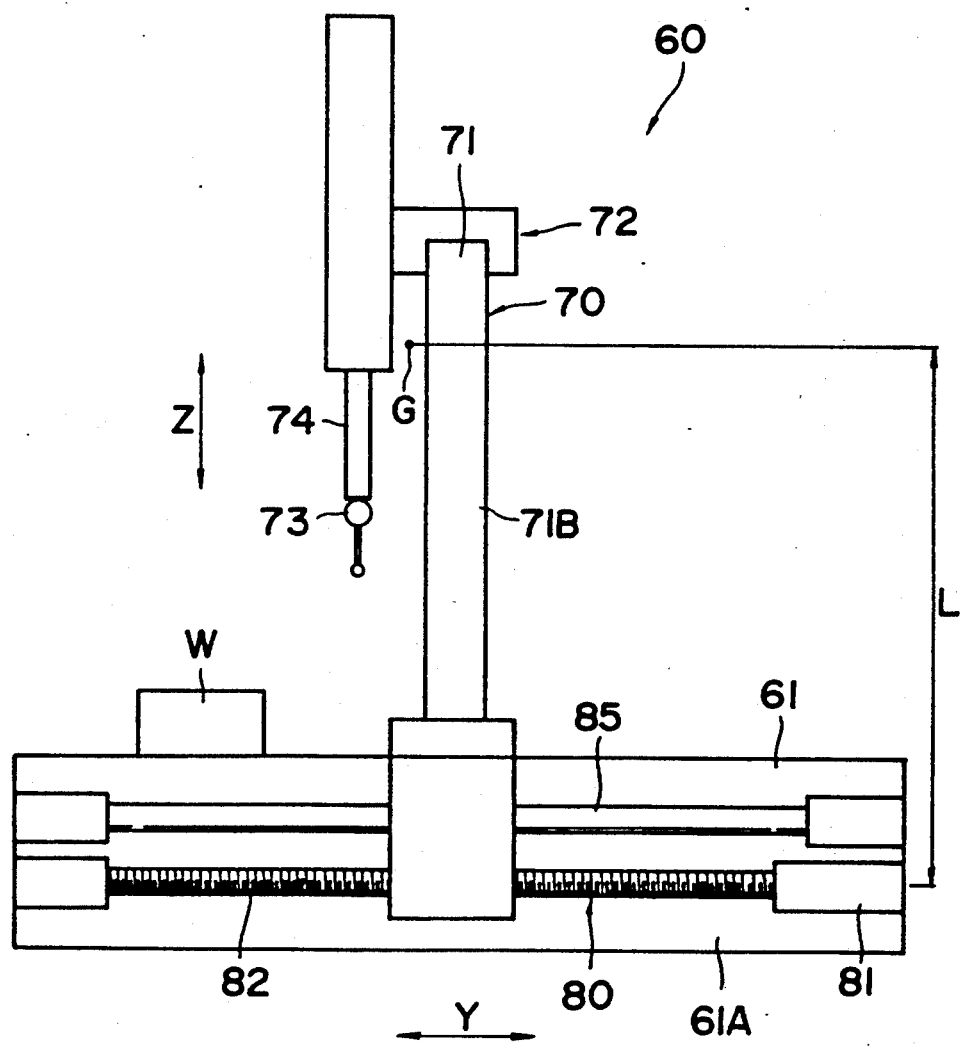
FIG. 5 is a side view of the conventional example.

In FIGS. 2 and 3, denoted by 28 is an eccentric motion distransmitting device for the ball screw 48 disposed between the nut member 27 and the column 23 of the Y-slider 21. The eccentric motion distransmitting device 28 consists of a pair of balls 28A and length control members 28B and have a function that the nut member 27 and the Y-slider 21 horizontally keep the positional relationship with the ball screw 48 but can change it in a direction perpendicular to the axis of the ball screw 48. Hence, even if the ball screw 48 is eccentric or bent, the Y-slider 21 would not be influenced but forced to move toward the Y-direction.

Denoted by 55 is a rotary encoder provided between the shaft 49 of the ball screw 48 and the bearing member 47, which detects a rotation angle of the ball screw 48 or a displacement value of the Y-slider 21. The out-put from the rotary encoder 55 is used for controlling the motor 45 via a not-shown control device, if necessary.

The coordinate measuring machine 10 in this embodiment is fundamentally constructed as explained above. The operation of the machine 10 will be followingly described.

First of all, if the motor 45 is operated, its power would be transmitted to the ball screw 48 through the coupling 44, the rotating element 42, the timing belt 52 and the rotating element 51 in due course. Since the ball screw 48 is turned in either direction of the arrow R, the nut member 27 coupled to the ball screw 48 and also the Y-slider 21 are moved in either direction of the arrow Y.

Subsequently, the X-slider 31 and the Z-slider 32 are controlled to carry the measuring element 3 to the not-shown origin for measurement in order to set a zero adjustment. The adjusted measuring element 33 is then used so as to come into contact with and trace the outer surface of the object W to measure the dimensions and configuration of the object W.

The following effects can be obtained by this embodiment.

The driving device 40 for displacing the Y-slider 21 is provided above the table 11 but lower than the center of gravity G, so that the distance L1 from the center of gravity G to the driving device 40 is approximately half of that in the conventional machine. Hence, the inertia I of the Y-slider 21 when moving can be minimized. The Y-slider 21 does not tilt, swing and vibrate as in the past, but moves straight to thereby perform fine measurements of the dimensions and configuration of the object W.

And, since the driving device 40 is not provided nearby the center of gravity G, whenever the slider device 20 is shifted beside the motor 45 on the table 11, it should be easy to place the object W onto and take it off from the table 11 as in the conventional gate-type coordinate measuring machine.

The above is the preferable embodiment of the present invention. However, the present invention can be arranged and modified by providing a Y-slider 21' (FIG. 1B) with a pair of columns 23', 24' which are of the same size with each having identical driving devices 40,40' thereon. The reference numbers for the drive device 40' are the same as has been used to describe the drive device 40, except that a prime has been added thereto. Further discussion about the drive devices 40,40' is deemed unnecessary.

The Y-slider 21 in the above embodiment is constructed with a pair of the columns 23, 24 and a connector beam 25, but can be otherwise of an integral construction.

As has been mentioned, some merits in the conventional gate-type coordinate measuring machine are not spoiled, the strain of the slider device can be minimized, so that the precise measurement would be performed.

What is claimed is:

1. A coordinate measuring machine having a table, a gate-type slider device, movable on said table, including a pair of columns in a parallel state to each other and a beam crossing from one column to another, a measuring element movable on said gate-type slider device and driving means for moving the slider device with reference to the table, so that the coordinate measuring machine is capable of the measurement of dimensions and configurations of an object to be measured by using the measuring element, wherein said driving means includes a ball screw in a state which is parallel to the surface of the table and is rotatably and directly connected by a nut member mounted on at least one of said columns and is oriented in accordance with a dimensional range defined by a formula of $1/6H \leq h \leq 5/6H$, wherein "H" is a distance from the surface of the table to the top of the gate-type slider device, and "h" is a distance from the surface of the table to the center axis of the ball screw.

2. The coordinate measuring machine according to claim 1, wherein said dimensional range is $\frac{1}{4}H \leq h \leq \frac{3}{4}H$.

3. The coordinate measuring machine according to claim 1, wherein said driving means is connected to the column through an eccentric motion distransmitting device.

4. The coordinate measuring machine according to claim 3, wherein the eccentric motion distransmitting device consists of a pair of balls and length control members, so that the nut member and the Y-slider horizontally keep the positional relationship with the ball screw but can change it toward a direction perpendicular to the center axis of the ball screw.

5. The coordinate measuring machine according to claim 1, wherein said driving means includes synchronized drives on both columns.

6. The coordinate measuring machine according to claim 1, wherein the two columns are of the same size.

* * * * *